No. 848,745. PATENTED APR. 2, 1907.
J. E. HOPKINSON.
TIRE FOR VEHICLES.
APPLICATION FILED FEB. 28, 1906.
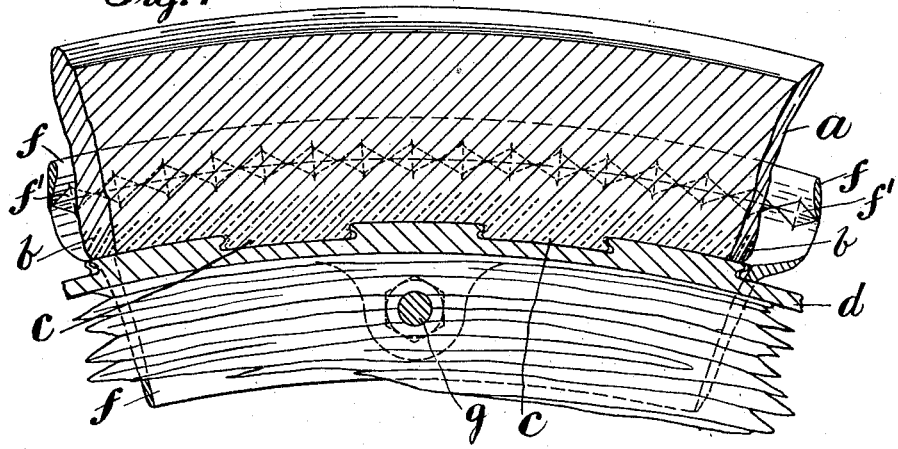
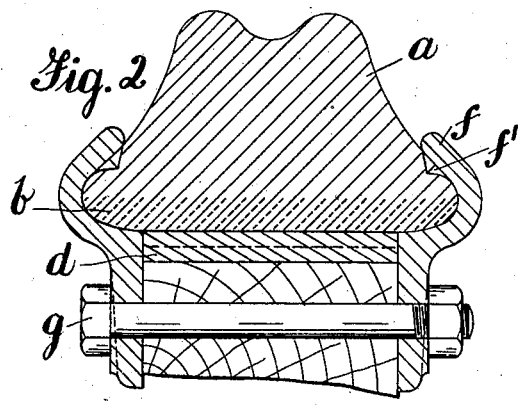
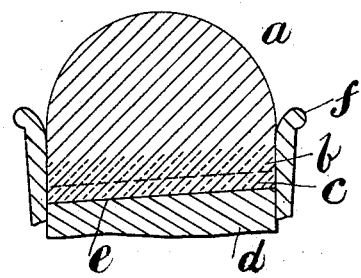
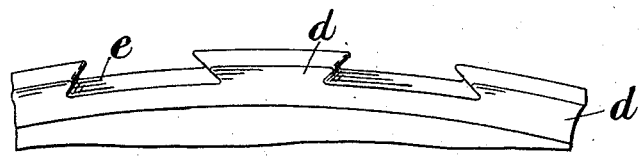
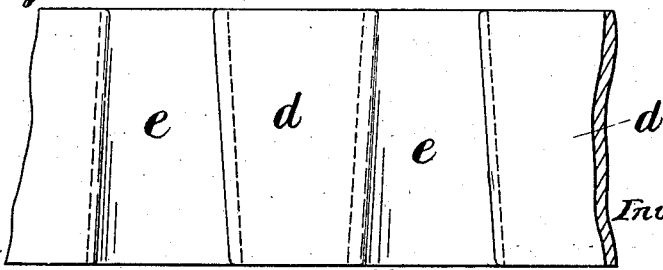
Witnesses:
Inventor:
John Ebenezer Hopkinson
By T. Walter Fowler atty.

UNITED STATES PATENT OFFICE.

JOHN EBENEZER HOPKINSON, OF WEST DRAYTON, ENGLAND.

TIRE FOR VEHICLES.

No. 848,745.        Specification of Letters Patent.        Patented April 2, 1907.

Application filed February 28, 1906. Serial No. 303,350.

*To all whom it may concern:*

Be it known that I, JOHN EBENEZER HOPKINSON, a subject of the King of England, and a resident of Para Rubber Mills, West Drayton, Middlesex county, England, manufacturer, have invented certain new and useful Improvements in Tires for Vehicles, of which the following is a full, clear, and exact specification, reference being had therein to the annexed drawings.

This invention relates to road-vehicle wheel rims and tires of the elastic type. Various methods have already been tried to prevent the tire creeping in its rim or tending to rise out of the same, and the present invention has reference to an improved connection between the tire and the rim or felly-ring for these and locking purposes and to the construction and arrangement of the flange-fixings commonly used when these are of the inturned shape.

My invention is particularly applicable to metal wheels, such as those in which the felly and spokes are in one piece.

In carrying out my invention I lock the tire to its felly by means of transverse projections upon the inner periphery of the elastic tire which engage and dovetail into correponding transverse undercut slots upon the outer periphery of the felly or rim. These projections and their slots may be other than at right angles to the plane of the wheel. I make the inner part of the tire of a harder rubber than the outer part or tread. The harder part is stiffer and more resistant than if the rubber tire were made of resilient, and therefore comparatively soft rubber throughout its depth and it is thereby absolutely prevented from being wrenched out of or away from the engaging connections. The introduction of the hard support for the resilient tread portion prevents undue wear at the meeting place of the projections and their slots and positively prevents the tire from being torn out of its locking-slots. In combination with the above locking arrangement a diamond bead is formed on the inner side of the flange-plates, toward the outer inturned end thereof, adapted to press into the tire and to tend to force it to bed down into the rim.

The invention is described with reference to the accompanying drawings, in which—

Figure 1 is a longitudinal section of a tire to which the present invention is shown applied. Fig. 2 is a cross-section of a similar tire. Fig. 3 is a transverse section of another form of tire fitted with the invention. Fig. 4 is a side elevation of the transversely-grooved felly or rim, and Fig. 5 is a plan of the same.

The elastic tire $a$ is preferably made of rubber and is fitted with a base portion $b$ of harder material than that of which the tread or outer portion is made. The inner portion is provided with transverse bars or projections $c$, extending right across the base $b$. The bed of the rim or the felly $d$, on which the tire is secured, is correspondingly slotted transversely at $e$, and the projections $c$ are adapted to seat themselves in the corresponding slots $e$. I shape the projections and slots so that the former will dovetail into the latter, the cross edges of the portions or heads between the slots being suitably rounded off, if desired, as shown in Figs. 1 and 4. These figures also clearly show the slots $e$ undercut at their sides.

The slots $e$ may taper in width from side to side, as shown in Fig. 5, or they may be inclined from one side to the other upwardly, so that they are not at right angles to the plane of the wheel, as will be apparent from Fig. 3. The projections on the inner periphery of the tire are correspondingly tapered or inclined, so that the tire may be applied to the rim or felly at the side and then pushed or forced upward into place, so as to surround and encircle the felly. When in position, the side plates or side flanges $f$ are bolted or otherwise secured in the well-known manner. On the drawings I have shown the side plates fixed in place by means of bolts $g$. The slots $e$, into which the projections $c$ are forced, may be both tapered and inclined from side to side, if so desired. Where they are made tapering in width, (see Fig. 5,) the bars or projections $c$ are similarly shaped, and the narrower ends of said bars are inserted into the slots $e$ from the wider ends of the latter.

The side plates or flange-plates $f$ are provided (see Figs. 1 and 2) upon their inturned edges with beads $f'$ or an interrupted beading forming diamond-shaped studs, which bed into the tire so as to tend to force the tire-base down into the rim. I arrange these beads $f'$ so as to be outwardly beyond the hard-rubber base of the tire and to be directed toward the felly or rim, so that they tend or assist to force the tire to bed down into the rim when the side plates are being applied.

The ring in which the slots $e$ are made may be shrunk on the wooden felly of an ordinary wheel, Fig. 4, or the ring may form the felly, as in the case of a metal wheel, Fig. 3.

I have found by experiment that it is essential to the proper working of these tires that the resilient rubber should be backed by a hard inner portion, such as is indicated on the drawings by the extra sectioning $b$, and accordingly the transverse bars or projections from the inner periphery and the part of the tire in depth adjacent thereto are made of hard rubber, such as rubber hardened to or almost to the degree of vulcanite, the outer tread portion remaining comparatively soft to retain its elasticity.

The locking of this improved tire (whether the latter is an endless ring or is made in sections or blocks) is effected by engaging and dovetailing the projections $c$ from its periphery with the cross-slots or grooves $e$ in the rim, as the tire is being slid laterally into place upon the rim, and the side plates $f$ afterward serve to maintain the tire in its proper position and prevent it returning sidewise off the rim. The diamond beading, which points inward of the wheel, faces the bed of the rim, forces the tire down into the latter, and prevents its middle portion tending to expand away from the rim or the projections engaged therewith.

Having thus described my invention, what I claim as such, and desire to secure by Letters Patent, is—

1. In a tire for vehicles, a rim, transverse slots in said rim, said slots being of tapered width, an elastic tire seated in said rim, said tire having a rubber base harder than the tread, projections from the base of said tire, said projections being tapered in width and adapted to engage with and be locked in said rim.

2. In a tire for vehicles, a rim, transverse slots in said rim, said slots being of taper width and inclined to the plane of the wheel, an elastic tire seated in said rim, said tire having a rubber base harder than the tread, projections from the base of said tire, said projections being tapered in width, inclined to the plane of the wheel and adapted to engage with and be locked in said rim.

3. In a tire for vehicles, a rim, a periphery to said rim, said periphery being inclined to the plane of the wheel, transverse slots in said rim, said slots being of taper width and inclined to the plane of the wheel, an elastic tire seated in said rim, said tire having a rubber base harder than the tread, said base being inclined to the plane of the wheel, projections from the base of said tire, said projections being inclined to the plane of the wheel, tapered in width and adapted to engage with and be locked in said rim.

4. In a tire for vehicles, a felly-ring, transverse dovetail slots of tapering width in said felly-ring, a rubber tire, an elastic tread portion to said tire, a base to said tire of harder rubber, and transverse projections tapered in width from the base of said tire extending across said base and adapted to enter and fit said felly-slots.

5. In a tire for vehicles, a felly-ring having transverse dovetail slots of tapering width made therein, a rubber tire having an elastic tread portion and having a base of harder rubber, said base having dovetail projections tapering in width and fitting said slots, and flange-plates mounted upon the sides of the rim.

6. In a tire for vehicles, a felly-ring having transverse dovetail slots of tapering width made therein, a rubber tire having an elastic tread portion and having a base of harder rubber, said base having dovetail projections tapering in width and fitting said slots, and flange-plates mounted upon the sides of the rim said plates having inturned edges and a beading with diamond-shaped points projecting into contact with the tire.

7. In a tire for vehicles, a wheel-rim, transverse slots across said wheel-rim, said slots being of dovetail form tapering in width and having floors longitudinally inclined from end to end, an elastic tire having a hardened base, transverse projecting bars from and extending across said base, said bars being of dovetail form and having under surfaces inclined longitudinally from end to end and adapted to fit said tapered slots, and flange-plates upon the wheel-rim adapted to pull the tire into the bed of the rim.

8. In a tire for vehicles, a wheel-rim, transverse slots across said wheel-rim, said slots having their floors inclined longitudinally from end to end, an elastic tire having transverse dovetail projections across its inner periphery, said projections having their under surfaces inclined longitudinally from end to end, flange-plates on the sides of the wheel, said tire being adapted to be slid laterally upon the rim with the inclined projections fitting said inclined slots and to be retained in position by said flange-plates.

9. In a tire for vehicles, a wheel-rim, transverse dovetail slots across said rim, said slots being tapering in width and having floors inclined in the direction of their length, an elastic tire having a hardened backing, and transverse projecting bars across said backing, said bars being of dovetail form tapering in width and having under surfaces inclined in the direction of their length, said bars adapted to fit said slots, said tire being pushed laterally into place upon the rim, and means for holding said tire in position upon the rim.

In witness whereof I affix my signature in presence of two witnesses.

JOHN EBENEZER HOPKINSON.

Witnesses:
VICTOR F. FEENEY,
H. D. JAMESON.